April 7, 1942. E. E. KELLEMS 2,278,932
FLARING AND SWEDGING TOOL
Filed July 24, 1939 2 Sheets-Sheet 1
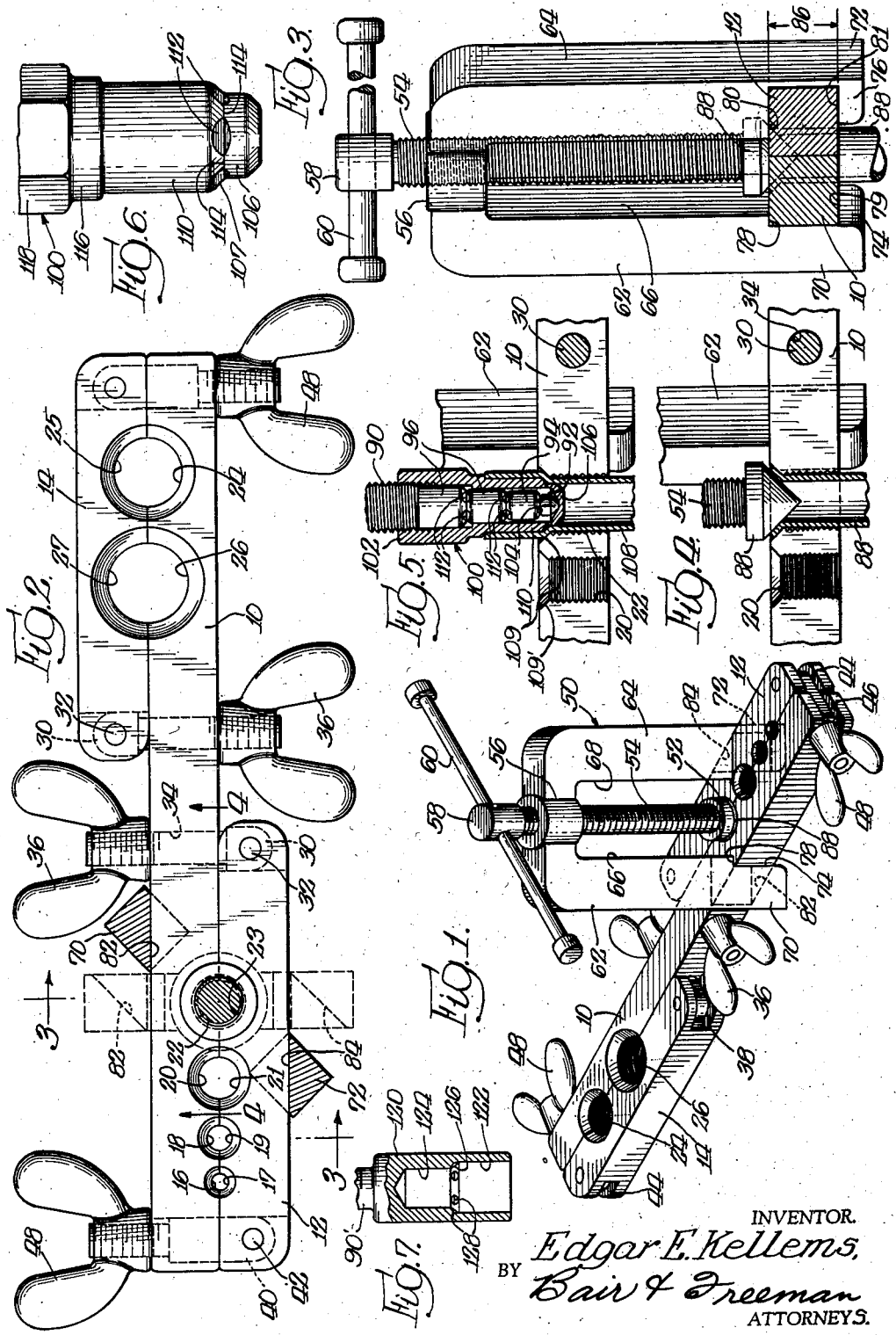
INVENTOR.
Edgar E. Kellems,
BY Bair & Freeman
ATTORNEYS.

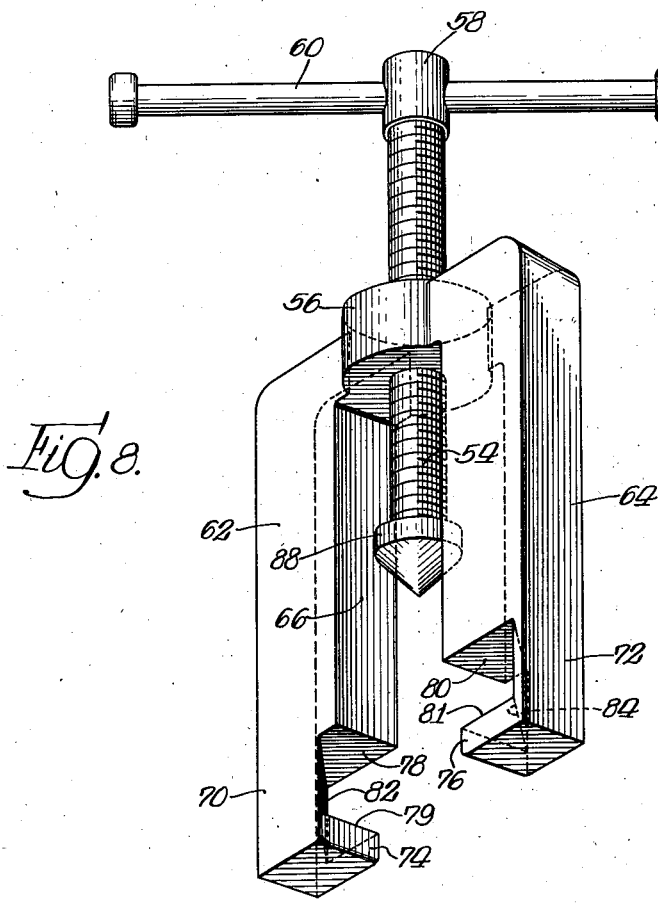

Patented Apr. 7, 1942

2,278,932

UNITED STATES PATENT OFFICE 2,278,932

FLARING AND SWEDGING TOOL

Edgar E. Kellems, Pasadena, Calif., assignor to The Imperial Brass Manufacturing Company, Chicago, Ill., a corporation of Illinois Application July 24, 1939, Serial No. 286,234

6 Claims. (Cl. 153—79)

My invention relates to tools for working ductile tubing and especially tools of the nature of flaring and swedging tools which are designed to form the cut end of a piece of ductile tubing into some particular shape.

Among the objects of my invention is the provision of a new and improved flaring and swedging tool of simple design including a clamping member for the tube and a yoke-like member carrying a tube spreading anvil which is provided with biased recesses of such a character that the yoke can be applied from one side of the bars, rotated in order to clamp it in place upon the bars over the tubing to be spread, and then after spreading is completed rotated a small portion of a turn in the reverse direction and withdrawn from the same side.

By providing a yoke which is applicable directly from one side only it becomes unnecessary to twist and turn the yoke about the bars either by sliding it over the edge before erecting it in place or by twisting it on from the end in order to properly mount it thereon. Furthermore, it is made possible by this arrangement to fasten the clamping bars upon a short end of tube in a small or restricted space and then to apply the yoke to the exposed side without it being necessary to turn or twist the clamping bars in any manner in order to make room for the clamping of a yoke to them.

Among other objects of my invention is the provision of a new and improved flaring and swedging tool which in addition to clamping bars for holding tubing to be flared or swedged includes a yoke of considerable length upon which can be secured swedging anvils of a variety of sizes, the yoke being securable in place upon the clamping bars by application from one side and rotation through a small portion of a turn thereby making it possible to apply to the bars a yoke of almost any convenient length suitable for making long swedging flares in tight corners or restricted spaces where it would be otherwise impossible to twist a yoke into place upon the clamping bars due to the limitations of space.

A further object is the provision of a new and improved flaring and swedging tool wherein the yoke can be applied to the clamping bars by insertion from one side and rotation in a right hand direction the yoke being further provided with a flaring or swedging anvil extendable progressively by means of right hand threads into a flaring or swedging position so that during the flaring or swedging operation the direction of rotation is such as to draw the yoke more firmly in place by rotation in a clamping direction so that the tendency for it to be dislodged or displaced during the operation is minimized.

A still further object is the provision in a flaring and swedging tool of a swedging tool anvil adapted to form a cylindrical enlargement on the end of ductile tubing suitable for the insertion of a second length of tubing thereinto which includes notches in the nature of kneading recesses which work the ductile tubing gradually out from a smaller to a larger diameter in order to produce a more smooth and even expanded portion.

There is also included in the objects the provision of a swedging anvil for relatively small sizes of tubing over which can be placed a series of anvil-like caps of different sizes for swedging relatively larger sizes of tubing.

With these and other objects in view, my invention consists in the construction, arrangement and combination of the various parts of my device whereby the objects contemplated are attained as hereinafter more fully set forth, pointed out in my claims and illustrated in the accompanying drawings, in which:

Figure 1 is a perspective view showing the device assembled for a tube spreading operation.

Figure 2 is an enlarged top view of the device with the yoke shown in section.

Figure 3 is a view partly in section taken on the line 3—3 of Figure 2.

Figure 4 is a fragmentary view taken on the line 4—4 of Figure 2.

Figure 5 is a modified form of the device showing a swedging anvil in use thereon.

Figure 6 is an enlarged view of the outside element of the swedging anvil.

Figure 7 is a view partly in section showing a swedging tool for reducing the diameter of tubing ends.

Fig. 8 is a perspective view of the yoke.

Although Figures 1 and 3 illustrate a flaring tool yoke of considerable length, capable also of use with a swedging anvil, it is contemplated that for flaring alone the yoke can be shortened a substantial amount making it slightly longer than the depth of a flare.

Heretofore in the construction of flaring and swedging tools of the character described there has always been present the problem of providing a means for quickly and readily assembling upon clamping bars for holding the tubing a yoke member bearing a spreading anvil for flaring or swedging the tubing. Due, of course, to the extremely great pressure exerted by threadably screwing a spreading anvil into the end of tubing it has been necessary to make the yoke member extremely rugged and its attachment to the clamping bars such that there would be no strain sufficiently great to warp the yoke itself.

Among tools of this sort in the prior art, in addition to those utilizing yokes fixed to the clamping bars, there have been provided other yoke-like members which have to be attached to the bars by sliding the yoke endwise over the end of the clamping bars or else yokes which need necessarily be applied from the edge of the bars and then rotated into place. Flaring and swedging tools are invariably called upon for use in extremely close quarters and when the parts of tools must be secured to each other by twisting them and sliding them one with respect to the other it is only with great difficulty that they can be used in places where there is little room to manipulate them.

The applicant, to obviate these difficulties, has provided a yoke which can be slipped quickly and readily into place on the side of the clamping bars opposite to the side on which the tube is clamped without it being necessary to shift it around on any other side or end.

As shown in the drawings a set of clamping bars is provided including a long central bar 10 to which is secured at one end a shorter clamping bar 12 and at the other end a similarly short clamping bar 14.

At the left end of the long clamping bar as viewed in Figure 2 there is provided a series of recesses 16, 18, 20 and 22 which are the counterparts of recesses 17, 19, 21 and 23, respectively, in the short bar 12 designed for holding tubing of different smaller sizes.

Similarly, at the right hand end are recesses 24 and 26 in the long bar cooperable respectively with recesses 25 and 27 in the short bar for larger sizes of tubing. The short bars in each case are secured to the long bars by means of a screw 30 pivotally mounted upon a pin 32 in the short bar which is adapted to extend through a hole 34 in the long bar wherein it is secured by an adjustable wing-nut 36.

A slot 38 is provided in each case in the short bar to permit the bar to be pivoted about the screw. At the outer end in each case there is provided a similarly pivoted screw 40 on a pivot pin 42 mounted in a slot 44 in the short bar and adapted to be swung into a similar slot 46 of the long bar wherein it is held in place by a wing-nut 48.

A yoke 50 is provided upon which is mounted a tube spreading or flaring anvil 52 as shown in Figures 1, 3 and 4, which is secured upon a stem 54 threadably mounted in a cross piece 56 of the yoke. At the outer end the screw is provided with a head 58 within which is loosely secured a cross bar 60 used for manually rotating the screw.

In addition, the yoke is provided with legs 62 and 64, herein shown long for a purpose which will appear later, wherein portions inward from the ends have faces 66 and 68 respectively spaced a distance apart slightly less than the combined width of the pair of clamping bars at either end. The legs likewise have outer portions 70 and 72 at the ends provided with faces 74 and 76 respectively spaced a distance apart very slightly greater than the combined width of a pair of clamping bars.

By having these inner and outer portions of the legs spaced apart as described there is formed a shoulder 78 on the leg 62 and a similar shoulder 80 on the leg 64 which abut against the top surface of the clamping bars when the yoke is applied thereto.

Moreover, in the leg 62 there is provided a diagonal depression 82 extending as shown by the dotted position in Figure 2 in a direction away from the clamping bar 10 from left to right of that view. Similarly there is a diagonal depression 84 in the leg 64 which in the dotted position extends away from the clamping bar 12 in a direction from right to left of that figure.

It will become apparent that the bottoms of these depressions are relatively parallel to each other and are so formed that the perpendicular distance between them is substantially equal to the combined width of two clamping bars. The depressions in the legs of course have a length 86 slightly greater than the thickness of a clamping bar so that the bar may be received readily into the depression and the upper edges are coincident with the shoulders 78 and 80 which thereby are utilized as guides for sliding the recesses over the bars.

The depressions, moreover, are located inward from the lower ends of the legs a slight distance so that lips 79 and 81 respectively on the legs 62 and 64 are provided near the ends which are designed to engage the underside of the clamping bars as shown in Figure 3.

When it is desired to apply a yoke to either end of the clamping bars the anvil need be withdrawn an amount only sufficient to allow the tip or point of it to pass, or almost pass, over the end of a length of tubing 88 secured by the clamping bars. The yoke is then placed immediately above the bars on the top side as viewed in Figure 1, 2 or 3. The bar is then located so that the point of the anvil fits into the end of the tube and this position is made possible by reason of the fact that the distance between the faces 74 and 76 is slightly greater than the combined width of the clamping bars.

The yoke is moved toward the bars until the shoulders 78 and 80, previously described, abut the top surfaces of the bars, at which point, in the embodiment shown, the yoke is rotated in a right hand direction so that the depressions 82 and 84 surround the corresponding edges of the bars, without however dislodging the anvil from its axial alignment with the tube to be flared.

In this position the yoke becomes clamped to the bars since the lips near the ends engage the undersides of the bars while the side edges of the bars are pressed against the bottoms of the recesses, thereby holding the yoke against the bars while the anvil is screwed into the end of the tubing to spread it into the form of a flare.

After the flare is completed it is necessary only to loosen the flaring screw and then rotate the yoke in a reverse direction until the faces 74 and 76 are parallel with the sides of the clamping bars. The yoke is removed by withdrawing it directly upward from the bars on the same side from which it was applied.

The yoke thus described is extremely well adapted to swedging tools which are in fact a particular form of tube spreading or flaring tool, the only difference being that in a swedging tool the end of the tubing is flared over a greater length and is at the same time flared into the form of a cylindrical enlargement having an inside diameter sufficiently great to admit the end of a tube of the same size wherein it is ordinarily sweated or soldered in place.

Since tubes when swedged must have an enlargement made of substantial length it is necessary to withdraw the spreading anvil a correspondingly great distance to provide for it. In order, therefore, to withdraw the anvil a correct distance it is well to have a yoke of sufficient length to permit such movement and it is only with a yoke which can be applied from the free or open side of a pair of clamping bars such as disclosed by the applicant that the use of a long yoke becomes convenient and practical.

In the swedging anvil herein provided, as shown in Figures 5 and 6, a screw 90 is used in place of the screw 54 of the regular flaring tool device but is mounted in the yoke 50 in the same manner. The free end of the screw 90 is provided with a series of stepped cylindrical portions 92, 94, 96 and 98, each larger than the next preceding cylindrical portion so that a smaller cylindrical portion having a diameter approximately equal to the inside diameter of a tube of a given size may act as a pilot entering the tube while the next larger portion having a diameter approximately equal to the outside diameter of the tube forms a spreading member which enlarges the end of the tube to such a diameter that it will receive the end of an unflared piece of similarly sized tubing.

To make the swedging tool adapted to a variety of sizes so as to accommodate all of the different sizes of tubes which can be clamped between the bars shown in Figure 2, the screw 90 in addition to the various cylindrical portions integral with it is adapted to be provided with anvil-like caps 100 having a screw-threaded upper end 102 with the same thread size as the screw 90.

The cap is likewise provided with a lowermost cylindrical portion 106 which as shown in Figure 5 acts as a pilot for the tubing 108 there shown in a flared condition, and a succeeding cylindrical portion 110 of slightly larger diameter for spreading the tubing 108 to a proper dimension. In the center of the bottom of the portion 106 there is a recess 104 designed to receive the end of portion 92 and assist the threaded upper end in centering the cap on the screw.

To further facilitate the spreading operation there are provided between each pilot portion and spreading portion a series of peripheral notches 112 which may be in any convenient number and which when spaced about the somewhat curved shoulder between cylindrical pilot and spreading portions form intermediate each pair of notches a series of solid sections 114.

In operation, when the anvil 100 is forced into the end of a piece of ductile tubing the cylindrical pilot portion 106 will first enter within the inside diameter of the tube after which the rounded shoulder will start spreading the tubing. As the anvil progresses into the end of the tubing the end reforms around the cylindrical portion 110. Similarly a portion 116 may form the guide for a hexagonal swedging portion 118 since the particular cross-sectional shape of the swedging anvil is not material.

In order to prevent reforming of the tubing too tightly against the anvil the alternate notches 112 and solid sections 114 are effective in supplying a kneading action upon the walls of the tubing as the anvil progresses inward, flexing the walls a slight amount so that the tubing is worked while the swedging action is taking place. The tubing thus worked loosely hugs the larger cylindrical portion next behind the pilot and the flared portion may be easily removed.

It will be further noted that the notched portion of the tool is made in the form of a flare as at 107 for example, in Figure 6, cooperating with corresponding flared ends 109, 109' in the tube clamping recesses 20 and 22 respectively, for example, thereby making a decided flare at the point where the tube is spread.

Moreover, by providing the anvil-like caps with right hand threads of the same dimension as the threads of the screw 90 these threads are permitted to perform a double function, one holding the cap in place and the other of advancing the anvil through the yoke.

Furthermore, all of the threads being right handed and the depressions 82 and 84 in the yoke 50 being likewise cut on such a bias that clamping is accomplished by rotating the yoke in a right hand direction the flaring operation may become simultaneously one of securely clamping the yoke to the bars, thus minimizing the chance of dislodgement.

A modified form of tool designed for outside swedging or reducing the size of a tube at the end is shown in Figure 7. An anvil 120 is designed to be attached to a screw 90' and is provided with a large aperture corresponding in diameter to the outside diameter of a tube to be swedged, and a smaller aperture 124 corresponding in diameter to the inside diameter of a tube. Separating the two apertures is a flared shoulder 126 provided with notches 128 for working the tubing end to the smaller size. The anvil is manipulated to swedge tubing by use of the notches in much the same manner as the anvils designed for swedging from the inside out. This type of swedging is especially adaptable when it is desired to have no enlargements where one piece of swedged tubing is joined to another.

There has therefore been provided a flaring and swedging tool of simple construction wherein all of the parts cooperate one with another in such a manner that a very small number of individual parts are needed in order to assure the positive working of the tool and in preserving the operable parts in accurate alignment.

The tool is furthermore so constructed that it can be made in proper dimensions to accommodate different kinds of tube spreading operations which can be performed with a maximum of convenienece under conditions which render the operation of such a tool ordinarily extremely difficult and in some cases prohibitive.

Some changes may be made in the construction and arrangement of the parts of my device without departing from the real spirit and purpose of my invention, and it is my intention to cover by my claims any modified forms of structure, or use of mechanical equivalents, which may be reasonably included within their scope.

I claim as my invention:

1. A tool for spreading the walls of ductile tubing comprising a pair of recessed clamping bars for holding tubing, means for holding said bars together, a yoke attachable to said bars comprising a frame having a cross piece and a pair of independent legs depending therefrom, said legs having inner portions with faces thereof spaced apart a distance less than the combined width of said clamping bars, outer portions of a length exceeding the bar thickness with faces thereof spaced apart a distance greater than the combined width of said clamping bars, and shoulders between said inner and outer portions for abutment against the tops of said bars, a depression in the face of each outer portion having a bottom lying in a plane parallel to the bottom of the other depression, each said depression having a length slightly greater than the bar thickness, said bottoms extending obliquely outward from the faces of the legs at opposite sides of the respective legs and having a depth such that the perpendicular distance between planes of said bottoms is substantially equal to the distance between the faces of said outer portions, the outer wall of each said depression forming a clamping lip at the outermost end of each leg, and a tube spreading anvil and stem therefor mounted threadably on the yoke for extension into flaring position in the end of a tube held by said bars, said yoke having an unclamped position relative to the bars wherein the faces of said outer portions lie adjacent the side walls of the bars and a clamped position angularly disposed relative to said unclamped position wherein the sides of the bar lie within said depression respectively and the clamping lips engage the faces of said bars remote from the anvil.

2. A tool for working the walls of ductile tubing comprising a pair of clamping bars having adjacent recessed contacting faces for holding tubing and outside lateral sides, means for holding said bars together, a yoke attachable to said bars comprising a frame having a cross piece and a pair of legs depending therefrom in position separated one from the other forming an open bottom, said legs having lower end portions separate from each other and of a height exceeding the bar thickness and inner surfaces spaced apart a distance not less than the combined width of said clamping bars, said legs having a depression in the lower end portion of each located upwardly from the end thereof having a height slightly greater than the bar thickness and extending laterally outward from the inner portion of each leg, each said depression providing at the bottom thereof a contacting portion for the side of the adjacent bar, a clamping lip at the lower-most end of each leg separated from the corresponding lip on the opposite leg, said yoke having an unclamped position wherein the legs lie in one position respectively relative to the outer sides of the adjacent clamping bars and the clamping lips are in position removed from the bottoms of the bars, said yoke having a clamping position wherein said legs lie in another position relative to said sides of the bars and wherein said clamping lips respectively engage the bottoms of said bars, and a stem mounted in the cross piece of the yoke and a tube-working element at the lower end of the stem adapted to be advanced into contact with the tube thereby forcing the lips of said yoke into clamping position against the bars and the tube working element into working position in the tube.

3. A tool for working the walls of ductile tubing comprising a pair of separable recessed clamping bars for holding tubing of various sizes, means for holding said bars together, a yoke attachable to said bars comprising a frame having a cross piece and a pair of independent legs having end portions free from each other extending therefrom, said legs having upper portions inwardly from the free ends having opposite faces spaced apart a distance less than the combined width of said clamping bars when clamped on tubing and lower portions of a length exceeding the bar thickness having opposite faces on said lower portions spaced apart a distance greater than the combined width of said clamping bars when in clamped position forming shoulders between the lower and upper portions for abutment against the tops of said bars, said lower portion of each leg having a depression slightly greater in height than the bar thickness, each said depression having one side wall thereof in the same plane as said shoulder extending outwardly from the inside face of the leg, a bottom wall parallel to the bottom wall of the depression in the opposite leg and distant therefrom an amount such that the perpendicular distance between said parallel bottoms is substantially equal to the combined width of the bars, a clamping lip adjacent the depression at the lower-most end of each leg, said yoke having an unclamped position wherein the faces of said outer portions lie adjacent and parallel to the sides of the clamping bars and the parallel bottoms at an angle relative thereto and a rotated clamped position wherein said parallel bottoms lie adjacent and substantially parallel to said sides of the clamping bars, and a stem threadably mounted in the cross piece of the yoke having a tube-working element at the lower end adapted to be advanced threadably into contact with the tube in the same direction as the rotation of the yoke from unclamped to clamped position thereby simultaneously forcing the yoke into clamping position on the bars and the tube-working element into working position against the tube.

4. A tool for working the walls of ductile tubing comprising a pair of recessed clamping bars for holding tubing each presenting a flat top surface adjacent the end of said tubing, means for holding said bars together, a yoke attachable to said bars comprising a frame and a pair of legs separate from each other and extending downwardly therefrom including portions on each leg of a height exceeding the bar thickness wherein adjacent sides are spaced apart not less than the combined width of said clamping bars and a shoulder on each leg adjacent said portion having an initial operative position abutted against the top faces of said bars, a depression in said portion of each leg having a height slightly greater than the bar thickness extending laterally into the legs providing thereby a space to receive the outer edge of each bar and a clamping lip at the lower-most end of each leg for holding the yoke to the bars, a tube-working tool and stem therefor mounted threadably on the yoke for extension into tube-working position against the end of a tube held by said bars, said yoke having an unclamped position on the bars by application of said yoke from one side of the bars in a direction perpendicular to said flat top surface and a clamped position wherein the yoke is rotated relative to the bars and the lips engage said bars.

5. A tool for working the ends of ductile tubing comprising a pair of recessed clamping bars for holding the tubing, a yoke operable therewith and a tube-working tool threadably mounted on the yoke adapted to be threaded progressively toward said bars into tube-working position, said yoke having members on opposite sides of the bars wherein opposite faces of said members are spaced apart a distance not less than the combined width of said bars, shoulders on said faces, said yoke having an unclamped position wherein said shoulders engage the top side of the bars, said faces having a length extending to the ends of said members and having recesses in said faces to admit the edges of said bars, said yoke in unclamped position having the faces lying in one angular position relative to the bars and a clamped position wherein the faces lie in another angular position relative to the bars.

6. A tool for working the ends of ductile tubing comprising a pair of recessed clamping bars for holding the tubing, a yoke operable therewith, bar engaging members on said yoke having an initial operative position adjacent the side walls respectively of said clamping bars and completely separated one from another and a tube-working tool mounted on the yoke extendable toward said bars into tube-working position, a side element on each bar engaging member for engagement with the adjacent side wall of the nearest clamping bar and a bar engaging lip on each said member separated one from another by a distance greater than the combined width of said clamping bars, said yoke in initial operative position having one angular relationship to said bars wherein the side elements are remote respectively from adjacent side faces of the clamping bars and the lips spaced laterally from the respective adjacent bars and disengaged therefrom and a clamped position in another angular relationship to said bars and to said unclamped position wherein said side elements are in contact with said respective adjacent side walls of the bars and said lips engage the bottoms of the bars.

EDGAR E. KELLEMS.